United States Patent
Ramos

[19]

[11] Patent Number: 5,924,768
[45] Date of Patent: Jul. 20, 1999

[54] HEADREST MOUNTED HANDLE TO ASSIST AN OCCUPANT UPON ENTERING OR EXITING A VEHICLE

[76] Inventor: Francisco Ramos, 1519 E. 30th St., Lorain, Ohio 44055

[21] Appl. No.: 09/118,765

[22] Filed: Jul. 14, 1998

[51] Int. Cl.⁶ ........................................... A47C 4/52
[52] U.S. Cl. ..................... 297/183.6; 297/183.7; 297/183.8
[58] Field of Search ............... 297/183.6, 183.7, 297/183.8, 183.9, 183.1, 183.4, 114, 391, 411.21, 463.1, 463.2, DIG. 10

[56] References Cited

U.S. PATENT DOCUMENTS

| | | | |
|---|---|---|---|
| 363,723 | 5/1887 | Brown | 297/183.8 X |
| 2,545,813 | 3/1951 | Jackson | 297/183.6 X |
| 3,145,050 | 8/1964 | Edwards | 297/183.8 |
| 4,113,307 | 9/1978 | Day | 297/183.6 X |
| 4,375,901 | 3/1983 | MacDonald | 297/183.7 X |
| 4,422,691 | 12/1983 | Vogel | 297/183.8 X |

FOREIGN PATENT DOCUMENTS 1116079  10/1961  Germany .............................. 297/183.6

*Primary Examiner*—Laurie K. Cranmer
*Attorney, Agent, or Firm*—Joseph H. Taddeo

[57] ABSTRACT

A pivoting handle for assisting a passenger of a vehicle upon entering, exiting or remaining in a vehicle. The handle includes one or more brackets for mounting the device on a single or multiple headrest bars, such that the handle will not interfere with extension or retraction of the headrest. Several of the disclosed brackets are designed for use in original equipment manufactured vehicles, while others are designed for use in integration into an existing aftermarket vehicle.

The body of the handle is made of an impact resistant material over a core of rigid plastic or metal, so that the shape can be retained. The body is jacketed with a vinyl or leather so that its color can be harmonious with the interior of the passenger compartment. The handle is shaped to provide a conformable grasp with both hands of the occupant.

20 Claims, 9 Drawing Sheets

HEADREST MOUNTED HANDLE TO ASSIST AN OCCUPANT UPON ENTERING OR EXITING A VEHICLE

FIELD OF INVENTION

The present invention relates generally to a handle device and apparatus that may be grasped by the hands of an occupant to assist him in entering, leaving or remaining in a vehicle and more particularly, to a handle that may be attached to the headrest of the seat in front.

BACKGROUND OF THE INVENTION

When a person enters or leaves the rear compartment of a vehicle, there may be occasions where personal assistance is needed. Those who are physically disadvantaged or physically handicapped may have a particular need for assistance. The very young and the aged sometimes need assistance because of the seating arrangements that are presently found in the rear seating compartments.

The need for seating assistance is not limited to passenger vehicles, such as automobiles, vans and trucks, but may also exist in the seating arrangements found in airplanes, trains, boats and even in public transportation vehicles.

Many automobiles provide single hand straps to aid those passengers being seated in the rear compartment. Some others provide hand grips attached to the roof, found slightly above the door. Generally these passenger assist devices are not positioned in the passenger compartment in such a manner, as to offer mechanical advantage to those entering or exiting a vehicle.

Passenger assist devices should be positioned in the passenger compartment where it offers a substantial amount of mechanical advantage to the passengers. Devices that use only a single handed grip do not offer the maximum mechanical advantage.

The placement of these passenger assist devices should be placed where they can be safely used without harm to the occupants in the event of a collision of some other type of calamity.

The selection of materials used in the passenger assist devices should also provide a safe environment should the occupants come inadvertently in contact with the devices.

There is also a specialized need for a passenger assist device that can be added to existing vehicles.

Many of the prior art apparatuses do not provide the maximum mechanical advantage to the passenger. Several devices are placed where the maximum mechanical advantage cannot be achieved.

U.S. Pat. No. 5,139,310, granted Aug. 18, 1992, to Y. Itoh, discloses a headrest with a decorative board to its rear. The decorative board is formed with a gripping hook member found in its inner wall. The gripping hook is snap fitted over the exposed part of a securing rod found in the headrest body.

U.S. Pat. No. 4,626,016, granted Dec. 2, 1986, to R. A. Bergsten is a handlebar mounted in the door frame of an automobile for passenger assistance in exiting from the vehicle.

U.S. Pat. No. 4,106,810, granted Aug. 15, 1978, to C. J. Barecki, discloses a grab rail for transit vehicle seats. The grab rail is an energy absorbing type designed for a transit vehicle having a longitudinal core material with a covering material around the core material.

U.S. Pat. No. 3,182,606, granted May 11, 1965, to B. D. Osgood, discloses a vehicle entry and exit assist strap and bracket. The assist strap is mounted on a bracket that automatically locks the strap in a stored position. The bracket contains an integral coat hook that is available when the assist strap is in the operative position.

U.S. Pat. No. 2,768,590, to Otto, is a hand rail for motor vehicles attachable to the inner roof above the seats.

U.S. Pat. No. 2,586,986, Sep. 21, 1949, to C. E. Orrison, discloses various embodiments of a hand support for automobiles, wherein each of the different forms of hand support is attachable to the window frame of the motor vehicle.

As can be seen from the discussion of the previous prior art, the handle is generally positioned in the passenger compartment where the occupant cannot achieve the maximum mechanical advantage. The handles or straps that were disclosed are for single hand use and again do not offer adequate support to the individual upon entering or exiting the seating area in the vehicle. In some of the prior art, the safety aspects needed to protect the occupants of the passenger compartments, are not adequately implemented in today's vehicles.

Therefore, a specialized need exists for a passenger assist device that can offer the maximum mechanical advantage to aid those in entering or exiting a vehicle as a passenger. In addition, the device must be composed of such material and composition to provide a safe riding compartment for the occupant.

SUMMARY OF THE INVENTION

The present invention defines an apparatus that mounts to an existing headrest of a vehicle to assist a passenger when boarding, leaving or riding in a vehicle. An automobile, for example, poses a difficult situation for the physically disadvantaged, the aged passenger, and even the very young, when entering or leaving the rear passenger compartment without some means of assistance.

This apparatus is for a passenger assist device that is large enough to be grasped with both hands of the individual wishing to gain access to the rear passenger compartment of a vehicle. When both hands are used to grasp a handle that is sufficiently large to accommodate the use of both hands, it enables the passenger to expend less energy especially during the boarding process. The rear compartments of many transportation vehicles are often cramped spaces that do not allow an adequate amount of room for others to assist the passenger.

For the ideal placement location of the passenger assist apparatus, it is best suited to be mounted to an existing headrest, so that the maximum physical and mechanical advantage can be obtained to assist a boarding or exiting passenger.

The headrests found in present day automotive vehicles come in various configurations; the most commonly found, being supported by either one or two posts, each having either a circular or rectangular cross-section. Disclosed herein are several brackets that are removable attachments for securing the passenger assist handle to each of the various styled headrests. One selected group of brackets is for use in original equipment manufacture; whereas, the second group is designed for use in the aftermarket.

Not only does the use of the present handle promote safety as well as utility, it gives a natural placement for using both hands, thereby obviating placing one's hands on the center doorpost as a means for entry. Children's hands are protected from having doors being accidentally slammed shut on their fingers by having them use the dual handed handle.

The invention further provides that the handle is adapted for pivoting toward and away from the passenger. This allows the passenger to grasp the handle in position for maximum leverage when lifting out of the seat or alighting into it.

The handle is formed from a core of a rigid material, such as plastic or metal. The core is then sheathed with an impact energy absorbing material, such as molded polyurethane. An outer jacket of vinyl or leather completes the handle assembly. Shaped finger grips are provided along the bottom portion of the handle to ensure that the passenger can grasp the handle firmly. The outer covering fits conformably over the molded core assembly. By using a vinyl or leather covering, the color can be selected so that it blends harmoniously with the interior of the passenger compartment.

It is therefore an object of the present invention to provide a passenger assist handle that is placed in the passenger compartment in such a strategic position so that it gives the maximum mechanical and physical advantage to the passenger when boarding or leaving a vehicle.

It is another object of the present invention to provide a passenger assist handle that is positioned to give the maximum physical advantage by attaching it to the headrest of the preceding seat.

It is still another object of the present invention to provide a passenger assist handle that is shaped wide enough to accommodate the use of both hands to grip the handle upon boarding or exiting a vehicle.

Yet, it is another object of the present invention to provide a passenger assist handle that is of impact-absorbing design to prevent bruising or maiming the passenger in the event of a collision where the occupant may be thrust forward towards the preceding passenger seat and handle.

A further object of the present invention is the provision of a means and method for operator assurance that when the handle is in use, the hand or fingers of the passenger will not be jammed between the door and frame when the door is closed.

An additional object of the present invention is to provide a passenger assist handle that is jacketed in a vinyl plastic or leather over a core of material that is shaped with finger grips to enable a firm grasp when gripping the handle.

One additional object is to provide a passenger assist handle that is easily colored or dyed to be compatible with the shades of colors used in the passenger compartment.

Another object of the present invention is to provide a passenger assist handle that is shaped to conform to the contour of the preceding seat and headrest.

It is a final object of the present invention to provide a passenger assist handle that can be added to an existing vehicle without modification to the same.

These and other objects of the invention that are achieved by the present invention, will become apparent from the detailed description to follow, taken in conjunction with the accompanying drawings.

BRIEF DESCRIPTION OF THE DRAWINGS

The present invention is illustrated in the following drawings attached herein.

DESCRIPTION OF THE PREFERRED EMBODIMENT

Figure 1:
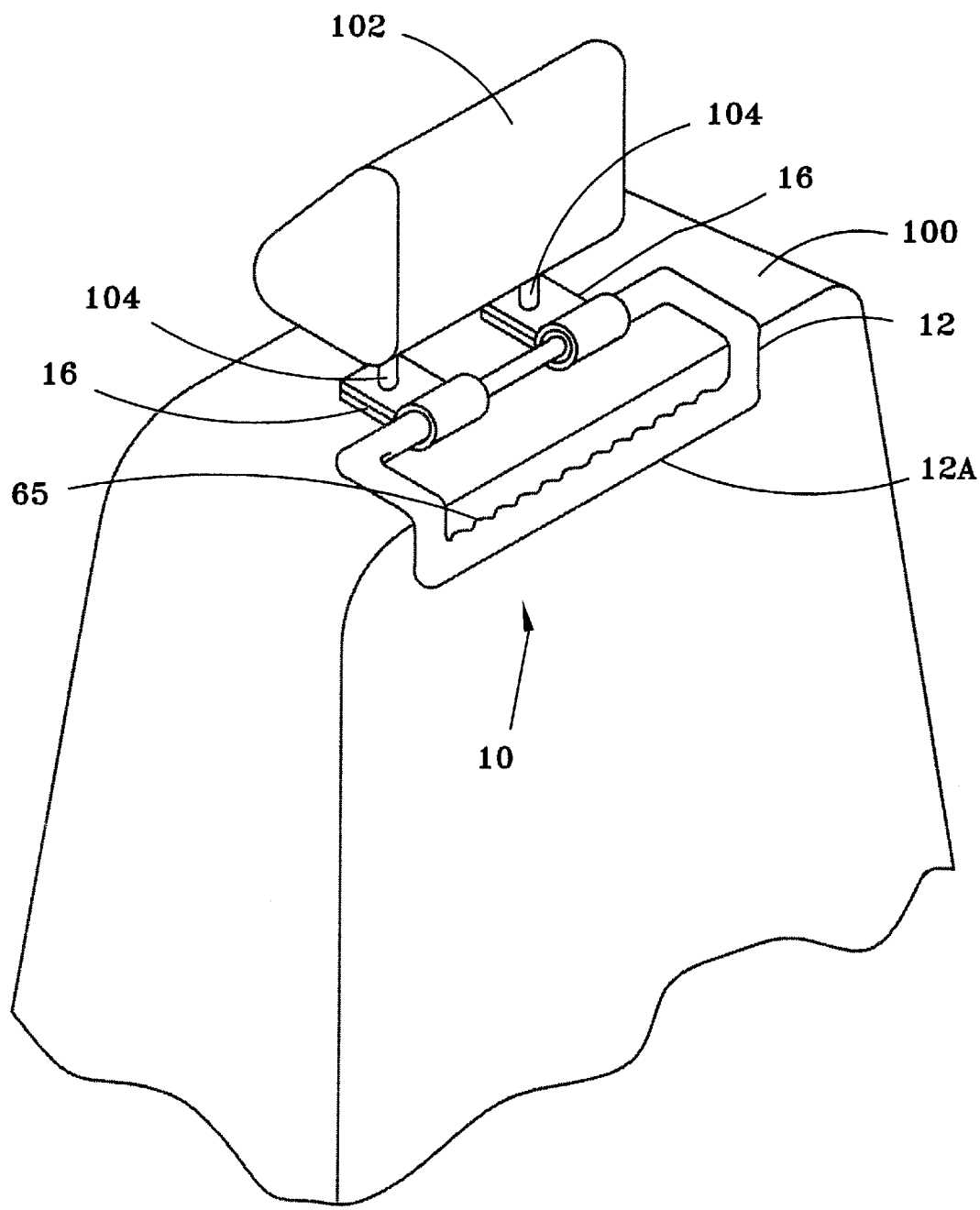
FIG. 1 is a perspective view showing the passenger assist handle, with accompanying brackets designed for use in an original equipment vehicle having a double posted headrest.
Figure 2:
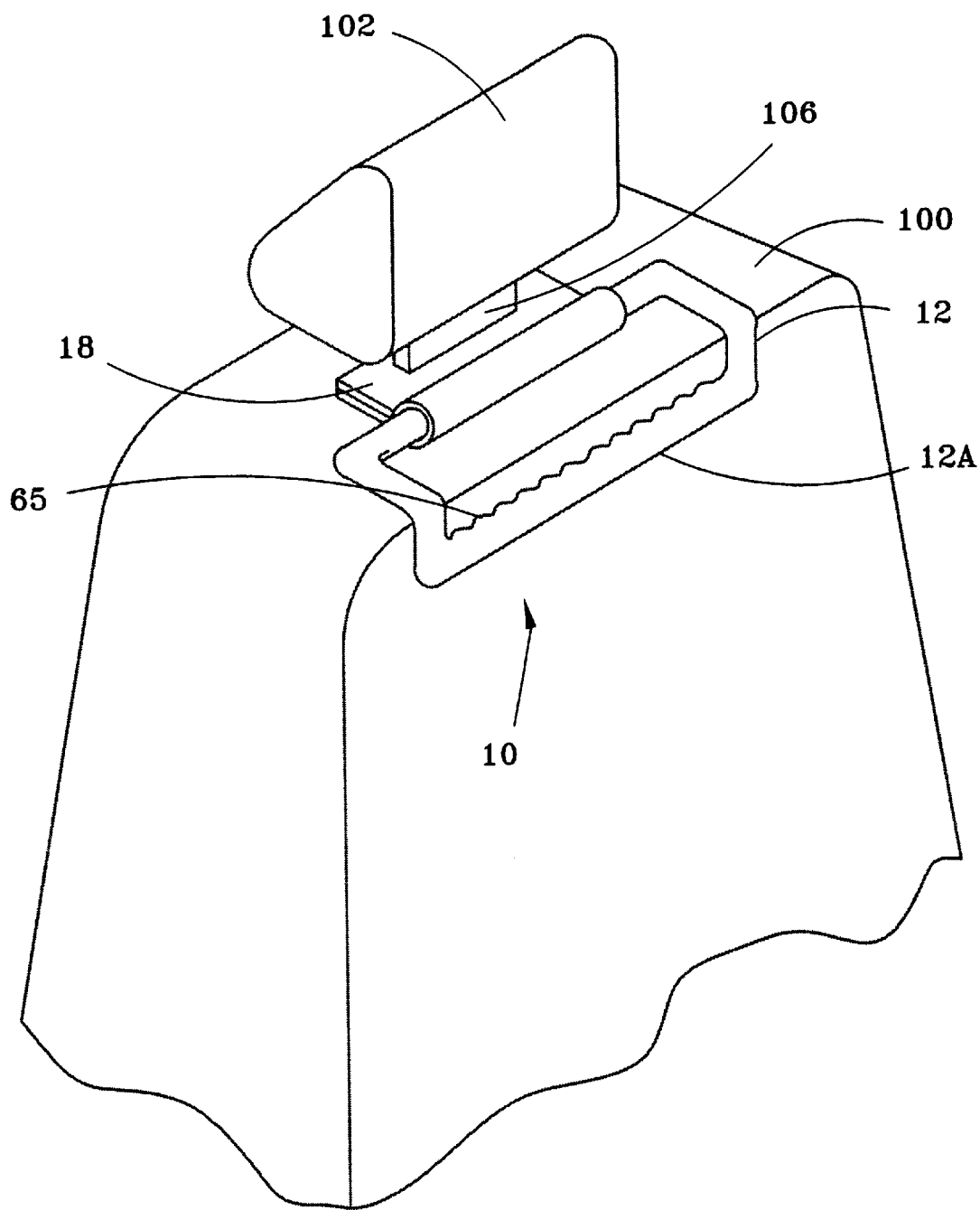
FIG. 2 is a perspective view showing the passenger assist handle, with accompanying brackets designed for use in an original equipment vehicle having a single posted headrest.
Figure 3:
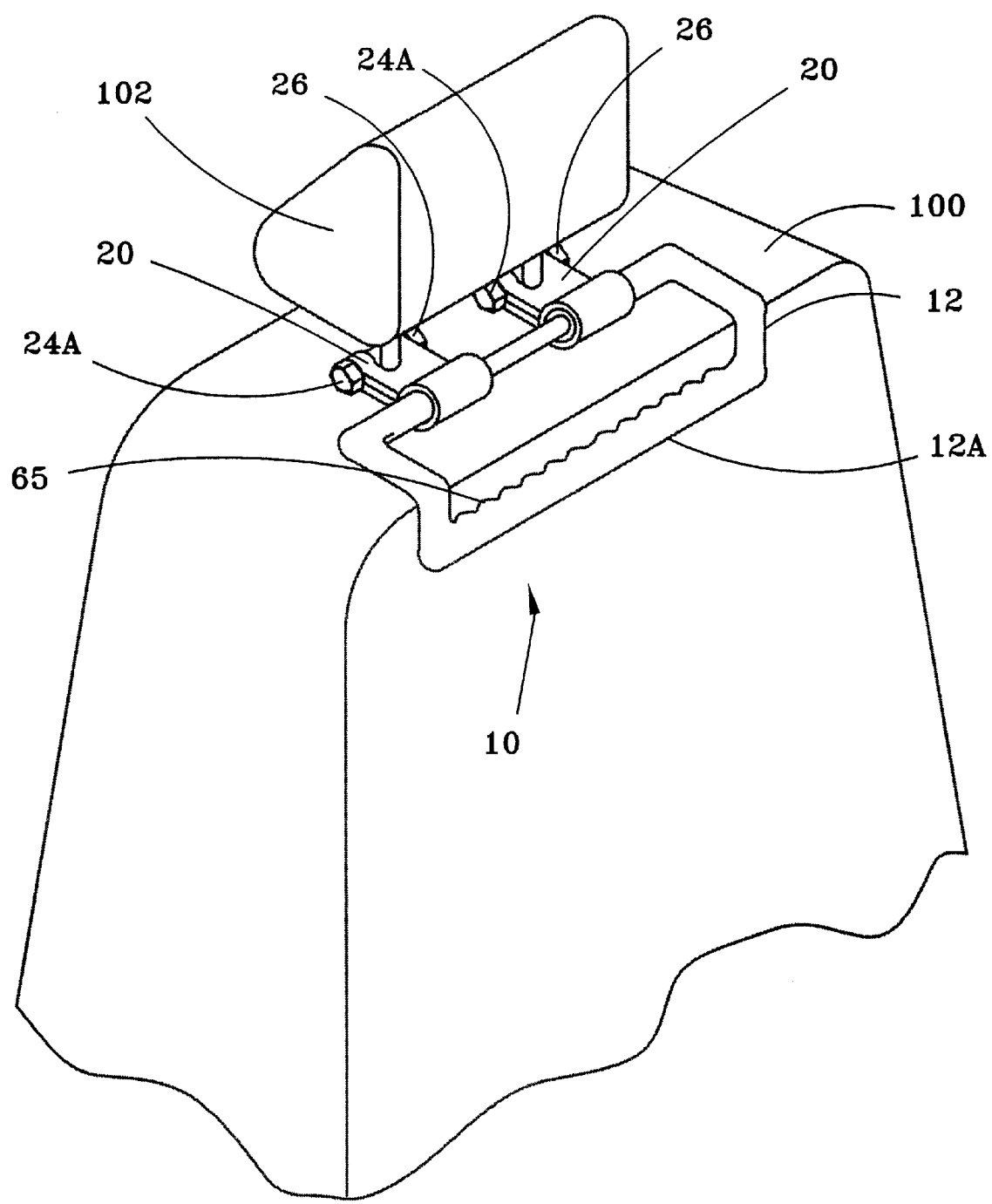
FIG. 3 is a perspective view showing the passenger assist handle, with accompanying brackets designed for use in an existing aftermarket vehicle having a double posted headrest.
Figure 4:
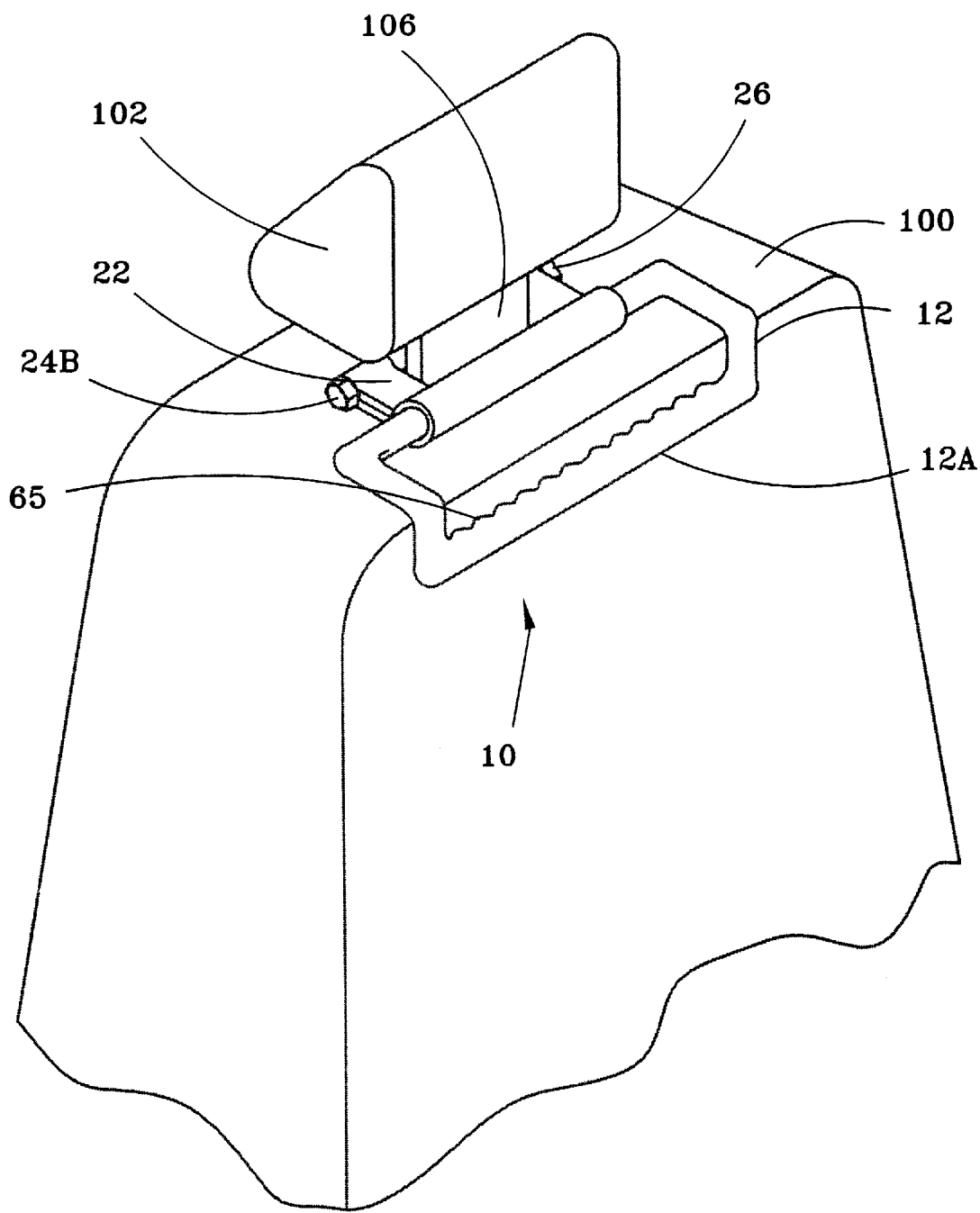
FIG. 4 is a perspective view showing the passenger assist handle, with accompanying brackets designed for use in an existing aftermarket vehicle having a single posted headrest.

According to the present invention, the vehicle passenger assist handle assembly 10 is shown in FIGS. 1, 2, 3, and 4, to which attention is now directed. FIGS. 1 and 2 are for passenger assist handles, with accompanying brackets designed for use in original equipment vehicles; whereas, FIGS. 3 and 4 are for handles with brackets adapted for use in existing aftermarket vehicles.

In general, this apparatus comprises a handle 12 connected to the headrest supports of a vehicle seat back 100 by means of individually designed brackets for use with both single and double headrest supports that are either circular or rectangular shaped in cross-sectional area.

Figure 5:
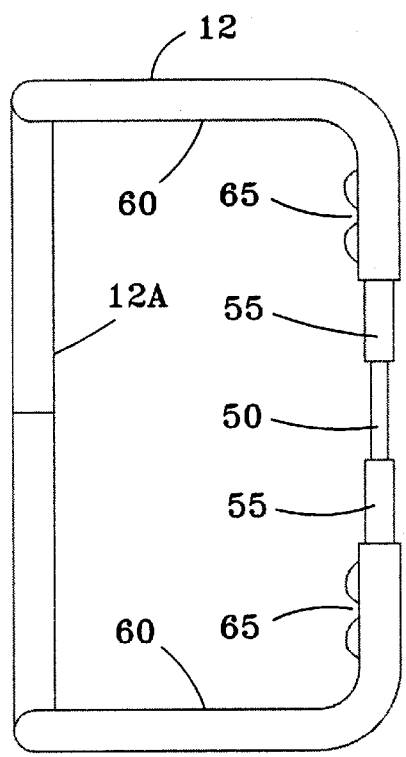
FIG. 5 is a front elevational view of the passenger assist handle detailing the internal construction.
Figure 6:
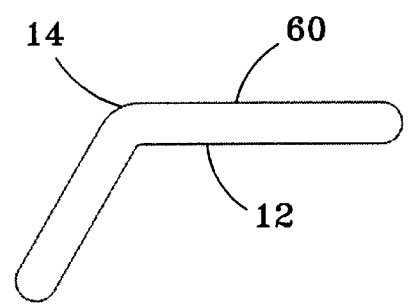
FIG. 6 is a side elevational view of the passenger assist handle.
Figure 11:
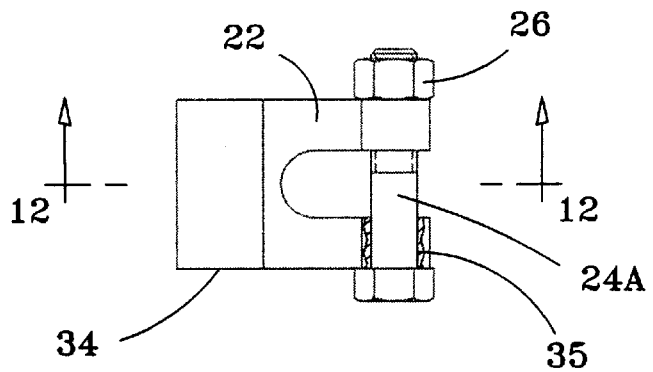
FIG. 11 is a top elevational view of a bracket adapted for use with an existing aftermarket headrest that uses a circular cross-section post.
Figure 12:
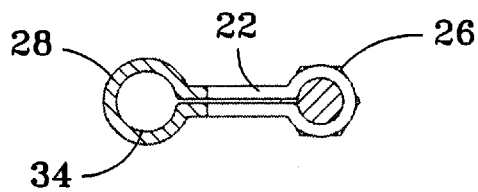
FIG. 12 is a side elevational view of a bracket adapted for use with an existing aftermarket headrest that uses a circular cross-section post.
Figure 13:
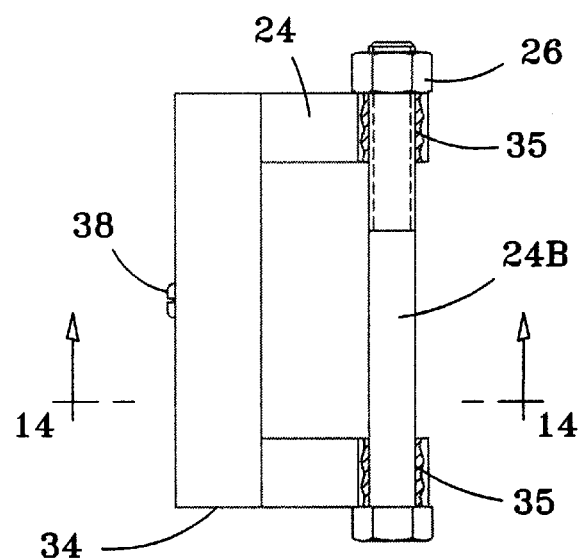
FIG. 13 is a top elevational view of a bracket adapted for use with an existing aftermarket headrest that uses a rectangular cross-section post.
Figure 14:
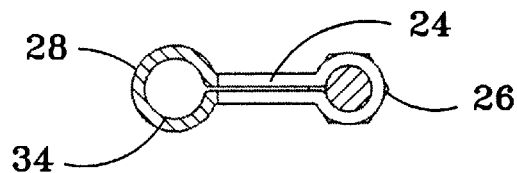
FIG. 14 is a side elevational view of a bracket adapted for use with an existing aftermarket headrest that uses a rectangular cross-section post.

In the preferred embodiment, as shown in FIGS. 5 and 6, the passenger assist handle 12 is formed from a core 50 of a rigid material, being a rod or tube having a diameter between one-half inch to two and one-half inches. The core is preferably formed as an essentially circular shaped handle 12 that can be grasped and can pivot toward the user. Of course, handle 12 can have rectangular, triangular, square, trapezoid and other shapes; or the rod can be formed as a bent or curved armature similar to that of bicycle handlebars. This handle has a near ninety degree bend 14 such that the handle, when not in use, rests conformably against the back of the vehicle seat back 100.

The core 50 is imbedded in an impact resistant sheath of an energy absorbing material, such as polyurethane. The molded polyurethane sheath or shroud 55 is shaped with finger grip depressions 65 to allow the passenger to have and maintain a firm grasp, with one or both hands when needed, without causing undue fatigue to the user. The entire assembly is jacketed with a vinyl or leather conformably fitted covering that can be colored as to present a balanced harmonious color scheme that is compatible with the interior passenger compartment.

Figure 7:
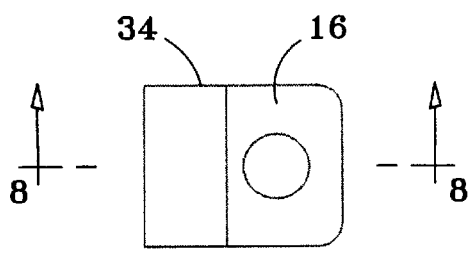
FIG. 7 is the top elevational view of a bracket adapted for use with an original equipment headrest that uses a circular cross-section post.
Figure 8:
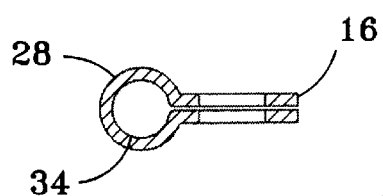
FIG. 8 is a side elevational view of a bracket adapted for use with an original equipment headrest that uses a circular cross-section post.

Turning now to FIGS. 7 and 8, bracket 16 is adapted for installation upon dual headrest posts, 104 in FIG. 1, whereupon the handle 12 is pivotally connected to the bracket for rotation about an axis. A way to further disclose the pivot axis for handle 12 is to describe the vehicle seat back 100 to include an upright back support portion that forms a plane of the back support. When the handle is pivotally connected to the partial sleeve of the bracket it pivots about an axis that is essentially parallel to the plane of the back support portion of the seat and perpendicular to the direction of travel of the motor vehicle.

Figure 9:
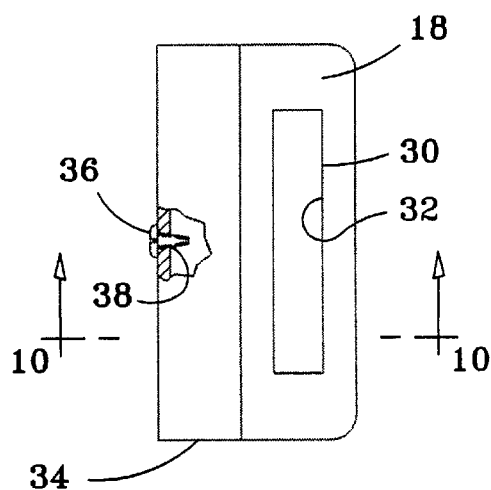
FIG. 9 is a top elevational view of a bracket adapted for use with an original equipment headrest that uses a rectangular cross-section post.
Figure 10:
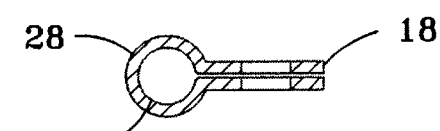
FIG. 10 is a side elevational view of a bracket adapted for use with an original equipment headrest that uses a rectangular cross-section post.

FIGS. 9 and 10 show bracket 18 installed on seat back 100 using a single rectangular headrest post, shown as 106 in FIG. 2. This post is somewhat wider than the individual brackets 16, as used with a headrest having multiple posts.

Bracket 18 has a slot 30 pierced through the piece. The perimeter 32 of the slot 30 is formed with the same shape and just slightly larger than the headrest bar 106 onto which it will be installed. Thus, the slot 30 is adapted to receive a headrest bar 106 installed within it.

However, in either event, each bracket 16 and 18, is formed from an essentially flat metallic piece 28. Brackets 16 and 18, also include a hinge portion that are formed as a rounded partial sleeve 34 that is dimensioned and adapted to receive, fit around and rotationally retain a long side or other portion of the rod or shaft of handle 12. Cylindrical sleeve 34 can also be described to have an axis that is perpendicular to the lineal or longitudinal axis of the headrest bar, whereby the handle positioned within the sleeve rotates on an axis that is likewise perpendicular to the lineal or longitudinal axis of the headrest bar or support. Thus, the sleeve 34 of the bracket 18 is adapted to receive the interfitted handle 12 installed within it, such that the rotating, grip portion 12A of handle 12 can rotate back and forth, toward and away from a passenger while the handle is mounted to the headrest bar 106.

Referring to FIGS. 11, 12, 13 and 14, shown are the brackets designed for use in the existing aftermarket applications. Regarding brackets 22 and 24, each is formed from a flat metal stock 28. Cylindrically formed handle receptacles 34 are formed on one side and, in addition, cylindrically formed receptacles 35 retain the cap screws 24.

In these figures, it is further demonstrated that brackets 22 and 24, preferably include apertures for insertion of threaded bolts 24A and 24B, thereby adapting the passenger assist handle of the invention 10 for installation and use in the automotive aftermarket.

Figure 15:
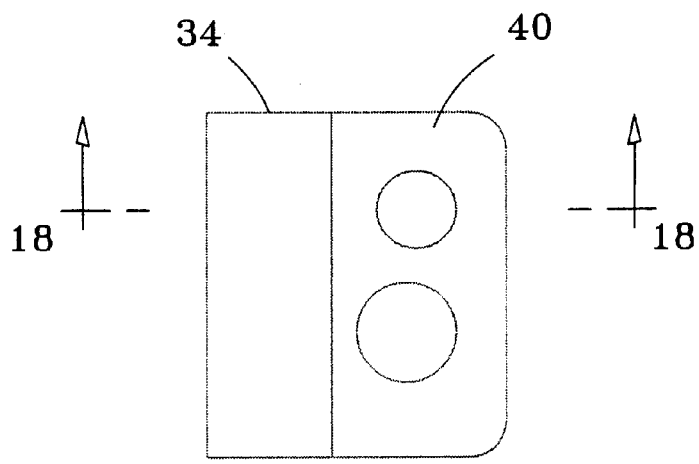
FIG. 15 is a top elevational view of a bracket adapted for use with multiple posted headrests having circular cross-sectional posts.
Figure 16:
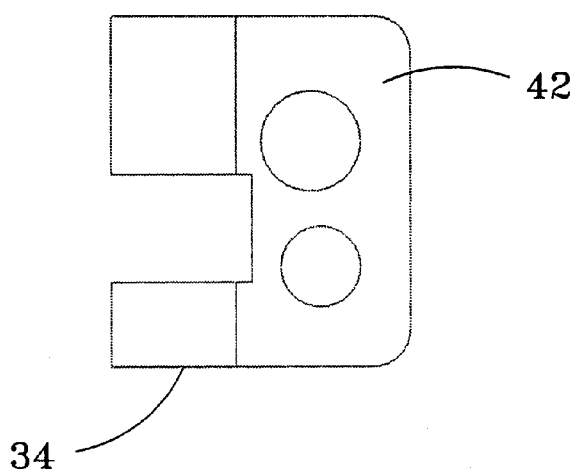
FIG. 16 is a top elevational view of still another bracket adapted for use with multiple posted headrests having circular cross-sectional posts.

In still another embodiment, another set of brackets, that are shown in FIGS. 15 and 16, find application for use with multiple posted headrests.

Figure 17:
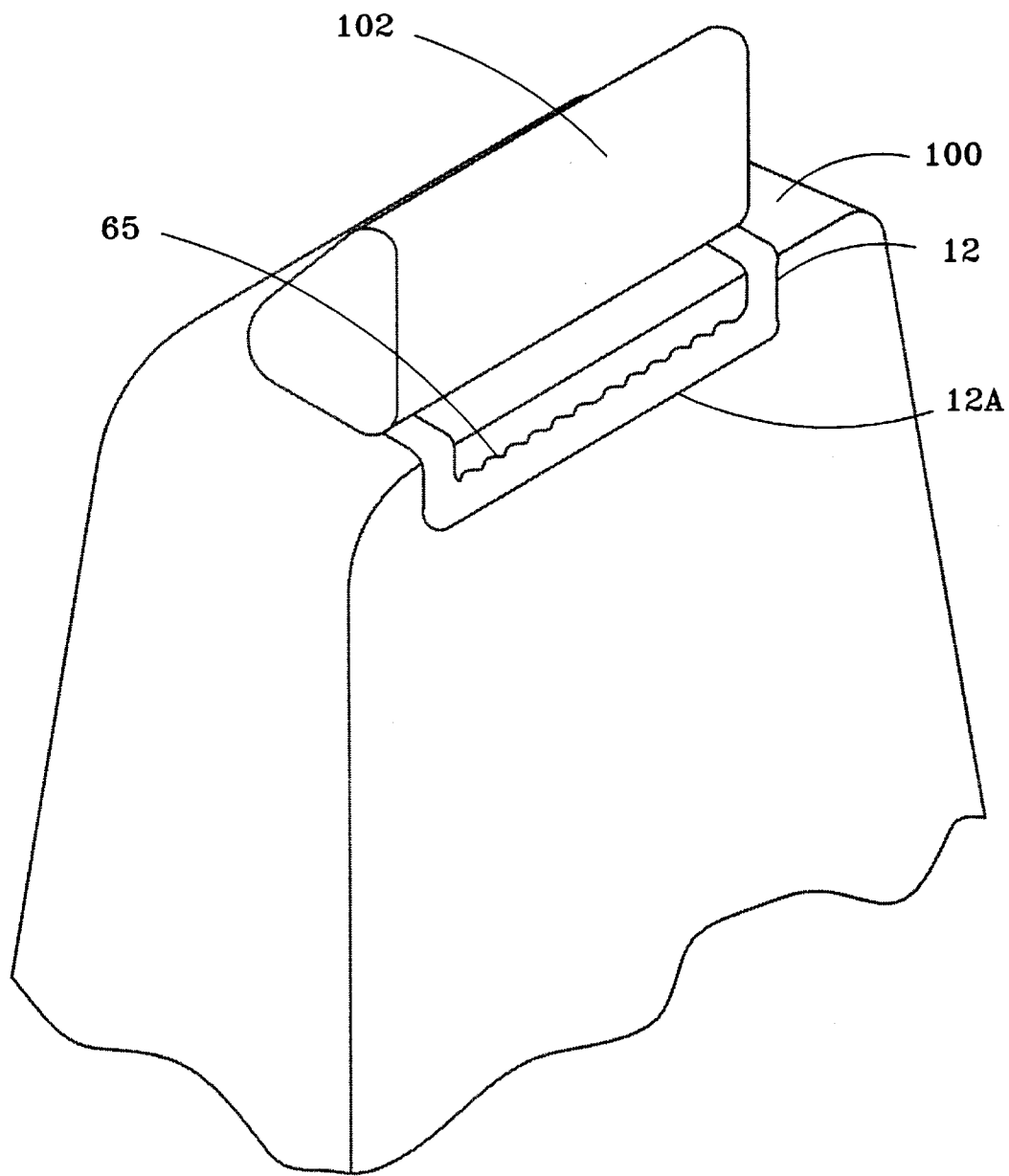
FIG. 17, is a perspective view showing the passenger assist handle, typically shown, with the headrest in its fully retracted normal functioning position.

With reference to FIG. 17, the assist handle 12 is typically shown in an operative position when once installed upon a headrest post. The headrest is shown in its fully retracted normal functioning position.

Figure 18:
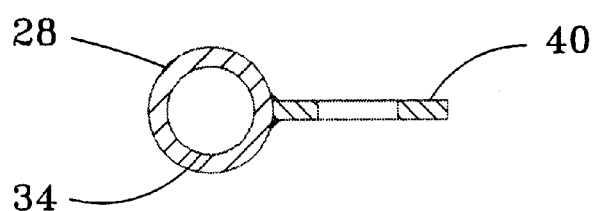
FIG. 18 is a side elevational view of a bracket wherein the sleeve is a total sleeve with a headrest post receiving tab welded to the tube.

As shown in FIG. 18, sleeve 34 may also be a total sleeve formed as a tubing section of sufficient dimensions to receive the rod of handle 12 or, more precisely, the rotating bar or shaft portion 12A of the handle 12, for rotation the handle within the sleeve 34

Figure 19:
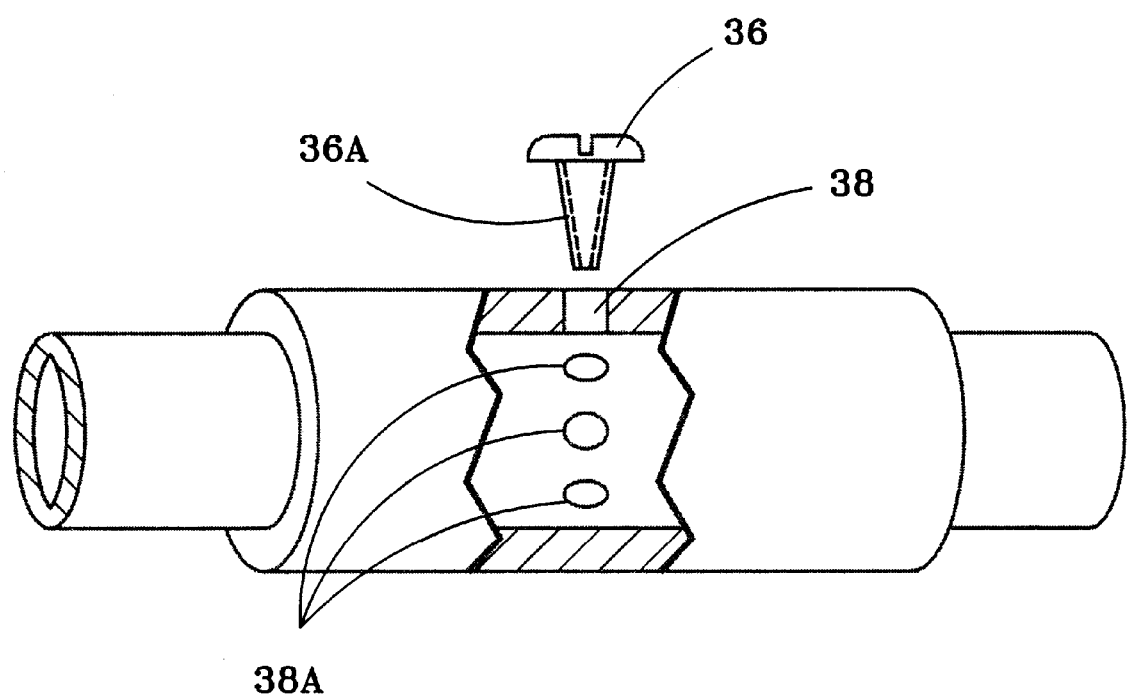
FIG. 19 is an exploded view of the spring-biased pin and its associated spring, for insertion in the sleeve hole and a corresponding shaft hole.

FIG. 19 discloses another embodiment of the invention, that incorporates a means for anchoring the handle 12 in a resting position against the back support portion of the seat 100. This retention means can be a spring (not shown) associated with the cylindrical sleeves 34 of brackets 16, 18, 22, 24, 40 and 42, to bias the handle in a desired position or a snap-lock mechanism formed as a pin or dowel 36, that is associated with the disclosed brackets, for snap-locking the handle 12 against the upright back portion of a seat 100 or in any other desired rotative position.

By use of the retention means or snap-lock mechanism, the passenger assist handle can be retained in convenient positions, such as an essentially horizontal position and other rotational positions between the back portion of the seat and the horizontal position. The retention means or snap-lock mechanism prevents rotation of the assist handle when rotational force is applied. The retention means can be: 1) a pinion gear with toothed rack wheel intermitting with teeth of a pinion wheel; the rack would preferably be associated with or positioned on the shaft portion of the handle and the pinion wheel associated with the bracket sleeve; 2) a ratchet mechanism with hinged catch or pawl associated with bracket, to engage, catch, restrain or ratchet with a toothed wheel whose teeth slope in one direction, the ratchet wheel associated with the shaft portion of the rod.

The retention means may also be: 3) a snap-lock mechanism simply formed by a spring-loaded pin or dowel 36 associated with cylindrical bracket sleeve 34 and with the shaft portion of the handle 12A. The pin is adapted to fit into, and be retained in position with bias of spring 36a, in one of a series of corresponding holes, dents or depressions 38 in the rotating shaft or bar portion 12A of the handle 12. While incorporation of the snap-lock mechanism is preferred, it will be apparent to those skilled in the art that other rotation preventing configurations within the scope of the invention may be employed.

When in use, the assist handle may be rotated to a desired position by finger pressure for pulling the pin 36 out of sleeve hole 38, and its corresponding shaft hole 38A, and then release of the pin when the desired handle position is attained. Pin 36 snaps back into shaft 12A and is retained there by spring bias of associated spring 36A. The assist handle 12 is thus positioned where the person using the handle will have ready access thereto. By gripping the handle, passengers have a simple guide to shift weight and by use of the hands and arms obtain relief from undue strain in passing to or from the vehicle, when sitting down or attempting to depart from a vehicle.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular suggestion or material to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

I claim:

1. A safety assist device for use by passengers in an automobile having seats equipped with a headrest and a headrest post, the device comprising:

a handle rotatable mounted on a headrest post of a preceding automobile seat and including a grip portion wide enough to accommodate the use of both hands of a passenger to grip the handle; wherein the handle has an essentially rectangular shape with parallel sides and is positioned behind an automobile seat to provide maximum physical advantage for a person entering or exiting the automobile;

means for rotatably mounting the handle on the headrest post;

means for rotating the handle grip portion toward and away from a passenger for ease in grasping the handle with both hands while the passenger is lifting out of or alighting into the automobile; and, wherein the handle includes a bend in the parallel sides for conformity to a contour of the automobile seat, whereby the handle, when not in use, rests conformably against a seat back for enhanced safety.

2. The device according to claim 1, wherein the handle grip portion is rotatable on an axis that is essentially perpendicular to a direction of travel of the automobile in which it is mounted, whereby a passenger can obtain leverage, by grasping the handle grip portion with both hands, against untoward movements of the automobile while seated therein.

3. The device according to claim 2, the handle comprising a core that is constructed of an impact-absorbing, semirigid material to prevent bruising or maiming a passenger in the event of a collision wherein the passenger may be thrust forward and contact the handle.

4. The device according to claim 3, the handle further comprising an impact resistant sheath that surrounds the handle core, the sheath comprising an energy absorbing material.

5. The device according to claim 4, further comprising a jacket covering conformably fitted over the entire handle sheath.

6. The device according to claim 5, wherein the means for mounting comprises a bracket that includes a hinge portion formed as a rounded partial sleeve to fit around and retain the handle with a pair of essentially flat projections that extend radially from the partial sleeve;

wherein each of the sleeve projections includes a corresponding slot pierced therethrough for receiving the headrest post and mounting the handle.

7. The device according to claim 6, the post having an axis and the partial sleeve having an essentially cylindrical shape and an axis; and, wherein the axis of the cylindrical sleeve is essentially orthogonal to the post axis.

8. The device according to claim 7, the means for rotating comprising the handle interfitted in the cylindrical sleeve portion for handle rotation in the sleeve toward and away from the passenger.

9. The device according to claim 8, wherein the device is transparent to a headrest and a headrest post of motor vehicle seats, whereby a headrest and headrest post on which the device is installed can be operated for extension and retraction thereof as though the device were not installed.

10. The device according to claim 9, wherein the device mounts onto a headrest post without any degradation to the automobile seat, the headrest or headrest post.

11. The device according to claim 10, the slot having the same shape and dimensioned just slightly larger than the headrest post, whereby the device is adapted for installation in automobiles by original equipment manufacturers.

12. The device according to claim 11, the sleeve further comprising a means for retaining the handle in a desired rotative position.

13. The device according to claim 12, the means for retaining comprising the sleeve having a spring biased pin and a hole through the sleeve to receive the pin; and, the handle having a plurality of corresponding shaft holes drilled therein, whereby the pin can be inserted through the sleeve hole into each of the plurality of shaft holes for retaining the handle in a desired rotative position ready passenger access.

14. The device according to claim 13, wherein the handle core comprises a tube.

15. The device according to claim 13, wherein the handle core comprises a rod.

16. The device according to claim 13, the handle core having a diameter between one-half inch to two and one-half inches.

17. The device according to claim 13, the sheath further comprising finger grip depressions for facilitating a passenger's grip of the handle.

18. The device according to claim 13, wherein the jacket covering comprises a vinyl material.

19. The device according to claim 13, wherein the jacket covering comprises a leather material.

20. The device according to claim 10, each of the bracket projections including a partial slot with the same shape and dimensioned just slightly larger than the headrest post, the slot having with a pair of opposed peripheral edges with a fastener receptacle formed in each of said pair to receive a fastener, and a fastener to enclose the partial slot, whereby the device is adapted for installation in the motor vehicle aftermarket.

* * * * *